Jan. 31, 1950 J. KATZMAN ET AL 2,495,734
ELECTRICAL CONNECTING LUG
Filed Jan. 1, 1945

INVENTORS.
JACOB KATZMAN.
PHILIP DUBILIER.
BY
ATTORNEY.

Patented Jan. 31, 1950

2,495,734

UNITED STATES PATENT OFFICE 2,495,734

ELECTRICAL CONNECTING LUG

Jacob Katzman and Philip Dubilier,
New York, N. Y.

Application January 1, 1945, Serial No. 570,862

3 Claims. (Cl. 173—324)

This invention relates generally to improvements in electrical condensers and more particularly includes improvements in the application of terminal members to condensers and the method of and means for preparing such terminal members.

In the manufacture of paper and foil condenser, it is the practice to wind or roll the paper insulation and metal foil into a compact mass or unit, either leaving this unit in a cylindrical shape, or pressing it into a flat or other desirable shape. The simplest form of such condenser comprises rolling up two layers of metal foil with layers of paper therebetween serving as the dielectric. These condensers are impregnated with a suitable varnish or wax or both respectively.

In the manufacture of inductively wound condensers where the metal foil is narrower than the dielectric or insulation strip, it is the practice to apply flat smooth-surfaced terminal members to the metal foil layers by engaging the terminal members respectively with the metal foil strips, the members being held against the foils by frictional engagement only.

It has been found, however, that, because of the smoothness of the foil and the contacting surface of the terminal member, and no matter how tightly the roll would be wound, the terminal member would either loosen and thus create a non-contemplated resistance in the circuit to which the condenser is applied or thus cause arcing between the terminal member and the foil; or the terminal member would slide out of the condenser unit, thus causing a break in the condenser circuit or perhaps, cause a short circuit therein.

Furthermore, during the formation of the condenser, and particularly when pressure has to be applied or the roll tightly wound, it happened, at times, that the terminal member would pierce or rupture the dielectric medium, thus not only causing weakening of the insulation between the metal foil layers, but also possibly causing a short circuit between the metal foil layers.

It is an object of the present invention to overcome the above-mentioned disadvantages by providing means by which the terminal member is adhesively secured to the metal foil without impairing the conductive relation between the terminal member and the foil and which means also serves as a reinforcing element between the foil and member as well as an additional insulation at the zone of engagement therebetween.

A further object of the present invention is to provide an improved method of maintaining electrical contacting engagement between a terminal member and the metal foil of a condenser.

A still further object of the present invention is to provide a reinforcing dielectric strip between a terminal member contacting the metal foil of a condenser, and an adjacent dielectric layer.

Yet another object of this invention is to provide said reinforcing dielectric strip with a tacky surface so that the said strip may be adhesively united to said terminal member and the surrounding area of the metal foil in electrical contact with the terminal member.

Another object of the present invention is to prepare terminal members with said adhesive strips in gangs and in such a manner that they may be readily individually removed from a suitable base or carrier.

Still another object of the present invention is to provide insulation means for anchoring the terminal member to the metal foil member of a condenser.

Further objects and advantages of the invention will appear from the following disclosure thereof together with the attached drawing which illustrates a certain form of embodiment thereof. This form is shown for the purpose of illustrating the invention since the same has been found in practice to give satisfactory and reliable results, although it is to be understood that changes might be made in the said embodiment, and therefore, the matter set forth herein or shown in the accompanying drawing is to be interpreted as illustrative and not in a limiting sense.

Figure 1:
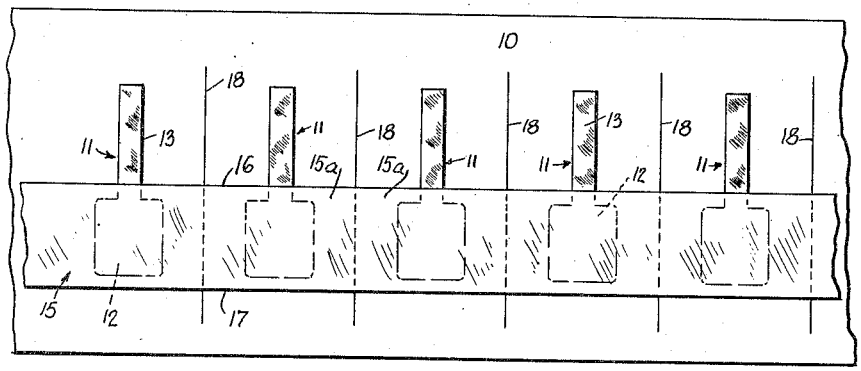
Fig. 1 is a top plan view of a portion of a strip containing a gang of terminal members and anchoring means therefor, made in accordance with the invention.

Referring now more particularly to the drawing, Fig. 1 discloses a method of or means for preparing the combined terminal members and anchoring means prior to their application upon the metal foil of the condenser.

Upon a base or carrier 10 made preferably of waxed paper, there are uniformly distributed in spaced relation a plurality of terminal members 11. These terminal members 11 may comprise a head portion 12 and a tail or reduced extending portion 13, the head portion 12 being adapted for electrical contact with the metal foil 14 and the tail or extending portion 13 being the current connection in the circuit to which the condenser is applied.

A tacky strip of insulation, such as tacky paper or cellophane 15 is disposed over the head portions of the gang of terminal members 11, the insulation strip 15 adhering to the members 11 and to the waxed paper carrier 10. Insulation strip 15 is preferably wider than the head portion 12, so that its longitudinal edges 16, 17, extend therebeyond, thus assuring a good electrical contact between the head portions 12 of terminal members 11 and the surface of the metal foil as will be hereinafter more apparent.

The insulation strip 15 is scored, slit, or perforated transversely in the spaces between adjacent terminal members, and this is expeditiously done by running a perforator or slitter across the layers formed by the insulation strip 15 and carrier 10, as indicated by the numeral 18 in Fig. 1. Thus, each terminal member 11 and its attached anchoring member 15a may be removed from the carrier 10, by engaging the tail 13 of member 11 between the thumb and finger of a hand and pulling away from carrier 10.

Figure 2:
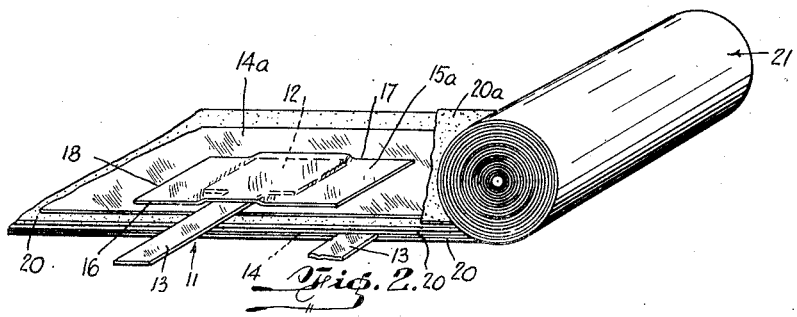
Fig. 2 is a perspective view of a portion of an electrical condenser (partially unrolled) utilizing terminal members and anchoring means seen in Fig. 1.
Figure 3:
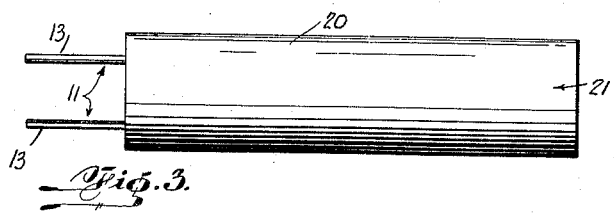
Fig. 3 is a perspective view of a complete electrical condenser embodying the invention.

After terminal member 11 and its anchor 15a has been separated from carrier 10, it is then applied to the metal foil 14a as clearly seen in Fig. 2.

The tacky surface of anchor 15a will cause firm adherence thereof with the metal foil 14a and terminal member 11, and the anchor 15 will maintain continuous electrical contact between terminal member 11 and foil 14a, besides acting as reinforcing insulation at the terminal member and the surrounding area, improving the dielectric quality of the condenser and preventing puncturing of the adjacent dielectric layer 20a of the condenser.

It is understood that the terminal member 11 may be secured by an anchor comprising any suitable dielectric material and provided with either a tacky adhesive whereby the anchor may be applied, removed and reapplied to a surface through the agency of the same adhesive; or provided with an adhesive or cement whereby the anchor may be permanently secured to a surface. It is further understood that the terminal member may be of any desired shape.

It is further understood that the adhesive may be eliminated and the anchor be employed as an additional strip of insulation. This strip of insulation because of the fact that it provides an additional thickness at the terminal member will maintain contact between the foil and the terminal. This is evident since when the condenser roll is made up, the overall thickness at the area where the terminal member is applied is greater than the areas where no terminal member and anchor is applied and the tendency would be to press the members or layers at that thickened area closely together.

In the condenser 21 shown in Fig. 2, the insulation or dielectric layers are indicated by the numerals 20, 20a and the metal foil layers by 14, 14a.

It will thus be seen that there has been provided by this invention an electrical condenser in which the various objects hereinbefore set forth, together with many thoroughly practical advantages, are successfully achieved.

Having thus described our invention, what we claim as new and desire to be secured by Letters Patent, is:

1. As a new article of manufacture, in combination, a waxed carrier having an adhesive repellant surface, a plurality of flat terminal members arranged in spaced relation on said adhesive repellant surface of the carrier, and a longitudinal strip of insulation material overlying a portion of all of said terminal members, said strip having a tacky surface in engagement with said terminal members and said adhesive repellant surface of the carrier, said strip being provided with separable portions extending across said strip substantially midway between successively adjacent terminal members.

2. The new article of manufacture according to claim 1 wherein said separable portions are cuts penetrating the surface of said carrier.

3. The new article of manufacture according to claim 1 wherein said separable portions are perforations penetrating the surface of said carrier.

JACOB KATZMAN.
PHILIP DUBILIER.

REFERENCES CITED

The following references are of record in the file of this patent:

UNITED STATES PATENTS

| Number | Name | Date |
|---|---|---|
| 1,393,077 | Brinton, Jr. | Oct. 11, 1921 |
| 1,476,682 | Beckmann | Dec. 11, 1923 |
| 1,719,298 | Knudsen | July 2, 1929 |
| 1,833,221 | Leidy | Nov. 24, 1931 |
| 1,926,553 | Morse | Sept. 12, 1933 |
| 1,952,554 | Lavarack | Mar. 27, 1934 |
| 2,184,272 | Driftmeyer | Dec. 26, 1939 |